United States Patent
Ochem et al.

(10) Patent No.: US 7,321,586 B2
(45) Date of Patent: Jan. 22, 2008

(54) METHOD FOR ESTABLISHING COMMUNICATION LINKS IN AN EXCHANGE IN A SWITCHING SYSTEM

(75) Inventors: Wolfgang Ochem, München (DE); Alfred Schneider, Haar (DE)

(73) Assignee: Siemens AG, München (DE)

(*) Notice: Subject to any disclaimer, the term of this patent is extended or adjusted under 35 U.S.C. 154(b) by 923 days.

(21) Appl. No.: 10/613,016

(22) Filed: Jul. 7, 2003

(65) Prior Publication Data
US 2004/0057426 A1 Mar. 25, 2004

Related U.S. Application Data

(63) Continuation of application No. PCT/DE02/00174, filed on Jan. 21, 2002.

(30) Foreign Application Priority Data
Feb. 1, 2001 (DE) ................. 101 04 543

(51) Int. Cl.
  *H04L 12/50* (2006.01)
  *H04M 7/00* (2006.01)
(52) U.S. Cl. ............... 370/357; 370/360; 370/375; 370/384; 379/156
(58) Field of Classification Search ............ None
  See application file for complete search history.

(56) References Cited

U.S. PATENT DOCUMENTS

| | | |
|---|---|---|
| 4,442,502 A | 4/1984 | Friend et al. |
| 4,509,168 A | 4/1985 | Renner |
| 4,583,218 A | 4/1986 | Ardon et al. |
| 4,972,465 A * | 11/1990 | Cline et al. ............ 379/279 |
| 5,533,114 A * | 7/1996 | Ballard et al. ......... 379/221.08 |
| 6,850,517 B1 * | 2/2005 | Kakiuchi ............... 370/370 |

FOREIGN PATENT DOCUMENTS

WO WO00/16565 A1 3/2000

OTHER PUBLICATIONS

Billhardt, R. A., et al; "A Survey of the Remote Switching Capabilities of the 5ESS Switch"; Proceedings of the IEEE Int'l Conf on Communications, Jun. 22-25, 1986, pp 1105-1110.*
"EWSD Remote Switching Unit—The intelligent solution for a smart remote"; Siemens Information and Communications Networks; 1999, pp. 1-16.*

* cited by examiner

*Primary Examiner*—Wing Chan
*Assistant Examiner*—Robert C Scheibel
(74) *Attorney, Agent, or Firm*—Siemens AG

(57) ABSTRACT

The present invention relates to a method wherein communication links between subscriber access lines of subscriber access units of an exchange in a switching system comprising a number of exchanges are established within the exchange concerned either directly in the respective subscriber access unit or between the subscriber access units connected by trunk lines directly to one another or via at least one subscriber access unit, without involving a central switching device of the exchange concerned, and under the control of the central controller belonging to this exchange.

5 Claims, 1 Drawing Sheet

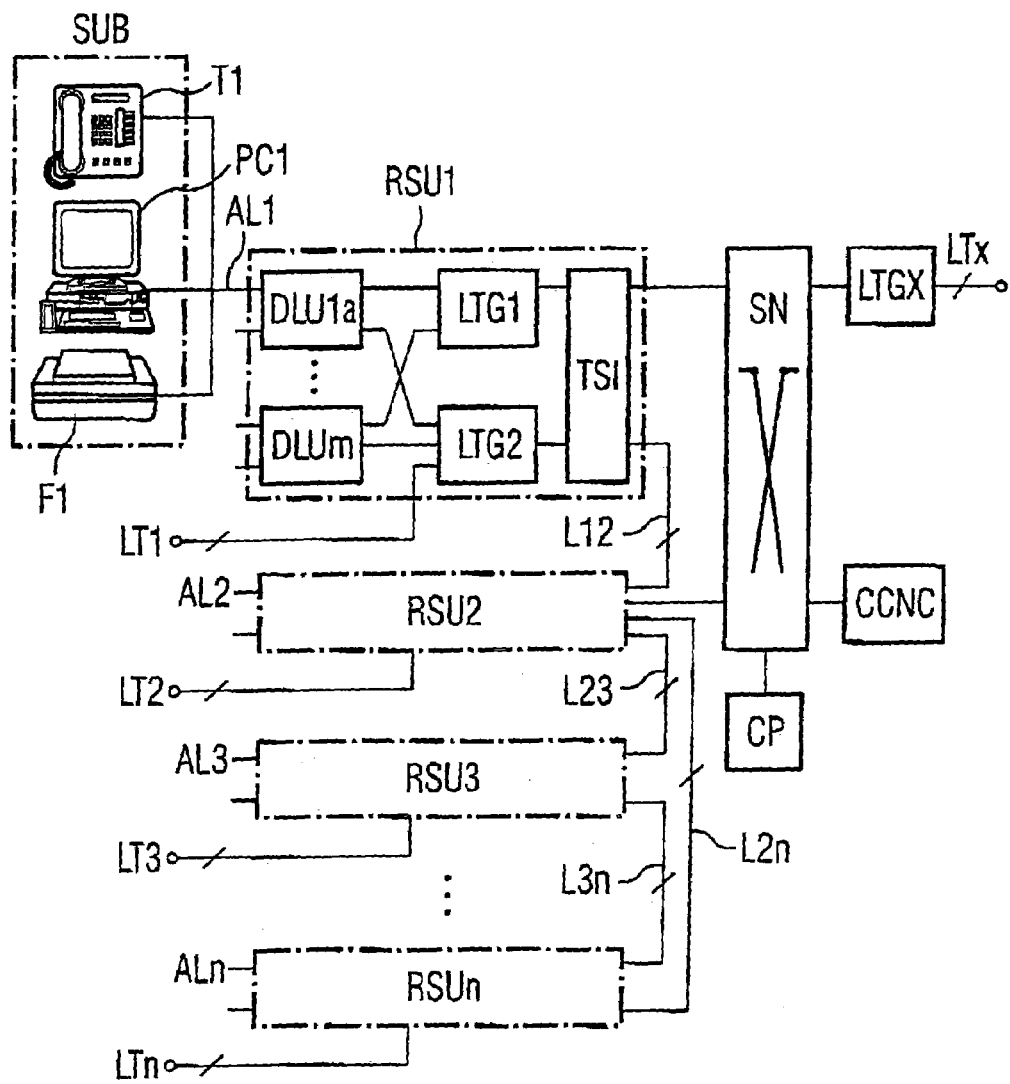

METHOD FOR ESTABLISHING COMMUNICATION LINKS IN AN EXCHANGE IN A SWITCHING SYSTEM

The present application is a continuation of international patent application PCT/DE02/00174, filed Jan. 21, 2002, which designated the United States, and which is herein incorporated by reference. In addition, the present application claims priority to German patent application 10104543.3 filed Feb. 1, 2001 which is herein incorporated by reference.

BACKGROUND OF THE INVENTION

The present invention relates to a method for establishing communication links to and from access lines which belong to line termination units of subscriber access units of an exchange in a switching system comprising a number of exchanges and to each of which access lines subscriber terminal equipment, in particular telephone, fax, PC and/or other communication equipment can be connected, wherein the subscriber access units are firstly connected to one another by means of a connection arrangement and are each connected to a central controller which, based on the dialing information fed to it from the line termination units, permits the establishment of the communication links concerned via a central switching unit, and wherein connections between access lines of line termination units which belong to one and the same subscriber access unit or to line termination units of subscriber access units which, on the basis of the connection by means of the aforementioned connection arrangement, are adjacent and can be established directly in the subscriber access unit concerned or between the subscriber access units which by means of the connection arrangement concerned are connected to one another and are adjacent to one another without the involvement of the aforementioned central switching unit.

A method of the type designated above brings with it in switching systems currently in use, like the switching system launched commercially under the name EWSD, a relieving of the load on the central switching unit since tie-line traffic within the respective subscriber access unit or between adjacent subscriber access units which in respect of remote network access are also designated remote switching units, takes place under the control of the central controller without the involvement of the central switching unit. Over and above these connection options, no connection options are possible here between different access lines of the various subscriber access units.

SUMMARY OF THE INVENTION

An object of the invention is therefore to indicate a way in which communication links can be established in a relatively simple way between access lines which belong to line termination units of various subscriber access units of one and the same exchange in a switching system comprising a number of exchanges.

The object indicated above is achieved according to the invention by a method of the type mentioned in the introduction in that connections are established between the access lines of line termination units of the one exchange concerned, which line termination units belong to subscriber access units which as a result of the aforementioned connection arrangement are not adjacent to one another, via trunk lines running directly between these subscriber access units or via at least one other subscriber access unit of the exchange concerned, controlled by means of the aforementioned central controller without the involvement of the central switching unit of this exchange.

The invention is distinguished by the advantage that communication links can be established simply between access lines of a variety of non-adjacent subscriber access units belonging to one and the same exchange via (additional) trunk lines between these subscriber access units directly or via at least one other subscriber access unit without the central switching unit of the exchange concerned being required for this purpose. This means that by means of the present invention communication links can be established between access lines of subscriber access units of the exchange concerned without the involvement of the central switching unit of this exchange even in a case where these subscriber access units are not connected via a trunk line, that is, directly to one another. This means that, compared with the method considered in the introduction, an even more far-reaching relieving of the central switching unit of the exchange concerned is achieved, so that this can be implemented at a lower cost since it does not need to be to be designed to take into account the entire tie-line traffic between subscriber access units of the exchange concerned which are not adjacent to one another. When the method according to the invention is implemented, the control functions continue on principle to be performed by the central controller of the exchange to which the aforementioned subscriber access units belong, while the message traffic between the access lines of the various subscriber access units of the exchange concerned is handled via the trunk lines between these subscriber access units.

Usefully, both communication signals and control signals are transmitted via the trunk lines between the subscriber access units of the exchange concerned. In this way, the aforementioned trunk lines can be optimally exploited for establishing communication links between access lines of various subscriber access units of one and the same exchange. This means that the existing subscriber access units do not all need to be directly connected to the central controller of their exchange; it suffices in borderline cases for one of the existing subscriber access units to be connected directly to the central controller of the exchange concerned and for each of the remaining subscriber access units of the exchange concerned to be connected to this one subscriber access unit via trunk lines either directly or indirectly via at least one other subscriber access unit of the remaining subscriber access units concerned.

If a subscriber access unit exists which is connected to a number of subscriber access units of the exchange concerned via a corresponding number of trunk lines, the trunk lines to be used by the one subscriber access unit concerned for transmitting communication signals to other subscriber access units of the same exchange are preferably determined in the central controller. This means that the trunk lines to be used by the one subscriber access unit concerned in the course of establishing communication links and of subsequently transmitting communication signals are stipulated in the central controller, thereby ensuring an orderly procedure for establishing the communication links concerned.

The measure considered above can also usefully be used to determine the trunk lines to be used in each case for transmitting communication signals in the event of overflow traffic. As a result, the establishment of communication links and subsequent transmission of communication signals from the one subscriber access unit under consideration and belonging to an exchange to other subscriber access units also belonging to the exchange concerned is secured even in the event of heavy communication traffic which results in the overflow of initially determined trunk lines or trunk groups.

Finally, it is advantageous that the subscriber access units which are all connected to or belong to one and the same exchange are also used for connecting trunk groups to or from other exchanges. In this way, the subscriber access units concerned can also be jointly used for tasks which normally have to be handled solely via the central switching unit of the exchange concerned.

BRIEF DESCRIPTION OF THE SEVERAL VIEWS OF THE DRAWINGS

The novel features believed characteristic of the invention are set out in the claims below. The invention itself, however, as well as other features and advantages thereof, are best understood by reference to the detailed description, which follows, when read in conjunction with the accompanying drawing which depicts in diagrammatic form an exchange in a switching system comprising a number of exchanges.

DETAILED DESCRIPTION OF THE INVENTION

The exchange in a switching system comprising a number of exchanges, shown diagrammatically in the drawing, has a series of subscriber access units RSU1, RSU2, RSU3 to RSUn, each of which can be provided for a remote subscriber access and which may also be referred to as remote switching units. The subscriber access units concerned RSU1, RSU2, RSU3, RSUn may each be set up in the same way; in the drawing, therefore, for purposes of clarity only the setup of the subscriber access unit RSU1 is shown with the degree of detail sufficient for an understanding of the present invention.

The subscriber access unit RSU1 has a series of line termination units DLU1a to DLU1m which may for example be digital line termination units. The line termination units concerned DLU1a to DLU1m each have a number of access lines, of which only access line AL1 is indicated in the drawing. A subscriber station SUB is connected to this access line AL1, which subscriber station may here comprise at least one digital subscriber terminal such as an ISDN telephone, a personal computer or PC, a fax machine and/or other communication terminal equipment. With regard to the subscriber station SUB, a telephone terminal T1, a personal computer PC1 and a fax machine F1 are indicated. It should be noted here that the individual subscriber stations may also comprise analog terminal equipment as well as other digital equipment which is connected to appropriately designed line termination units. The line termination units DLU1a to DLU1m are each connected via line terminator groups, of which only the two line terminator groups LTG1, LTG2 are shown in the drawing, to a time-slot converter TSI of the subscriber access unit concerned RSU1. This time-slot converter TSI serves to convert during the course of connections the individual subscriber stations in the subscriber access unit RSU1 to respectively allocated channel time slots in cases where these connections are to be established to subscriber stations within the subscriber access unit concerned RSU1 or to subscriber stations of other subscriber access units which are connected by means of a connection arrangement—which is examined in greater detail further below—directly or indirectly to the subscriber access unit RSU1. In the course of the connections concerned, communication signals can be transmitted in accordance with the time-division multiplexing principle, whereby different channel time slots can be allocated to the respective subscriber stations participating in a call, in respect of which channel time slots the aforementioned time-slot conversion is then required for transmitting communication signals. The aforementioned time-division multiplexing principle requires that the individual channel time slots are formed by time cells cyclically repeated in pulse frames.

With the previously mentioned time-slot converter TSI, which is indicated only diagrammatically and which has its own controller and interface circuits at its inputs/outputs, the subscriber access unit RSU1 is also connected to a central switching network SN of the exchange of the switching system under consideration. This switching network SN can be connected via at least one further line terminator group LTGX and one line group LTX connected with this line terminator group and comprising a large number of lines to another exchange in the switching system. Also connected to the aforementioned switching network SN as the central switching unit of the exchange shown are a coordination processor CP and a central signaling recording device CCNC which, with regard to signaling via a central signaling channel in accordance with signaling system no. 7, performs tasks over and above the pure recording of dialing information. In the present case, however, signaling in compliance with signaling system no. 7 is used only in the course of connections which are being or have been established between different exchanges in the switching system. The coordination processor CP and the aforementioned signaling recording device CCNC thus constitute a central controller of the exchange.

In the case of the remaining subscriber access units RSU2, RSU3 and RSUn, each indicated only diagrammatically, access lines AL2, AL3 and ALn are indicated in the drawing as representative of a large number of access lines provided there, to which subscriber stations corresponding to the subscriber station SUB may be connected. Of the further subscriber access units concerned, only the subscriber access unit RSU2 is connected to the switching network SN. In addition, the subscriber access unit RSU2 is connected via a trunk line or a trunk group L12 to the adjacent subscriber access unit RSU1 and via a trunk line or a trunk group L23 to the adjacent subscriber access unit RSU3. On principle, all subscriber access units provided are in this way connected to one another by means of an arbitrarily designed connection arrangement. The connection arrangement concerned may have a ring-shaped and/or a tree-shaped design. In the case of a connection arrangement with a ring-shaped design, multiple connection arrangements representing a number of sub-rings may incidentally also be provided, these being connected to and/or supplementing one another either directly or by means of a tree-shaped connection arrangement. The subscriber access unit RSUn, which is connected in this way to two adjacent subscriber access units not shown here, may, however, be adjacent to none of the subscriber access units shown RSU1, RSU2, RSU3; in the present case it is additionally connected via a trunk line or a trunk group L2n to the subscriber access unit RSU2 and via a further trunk line or a further trunk group L3n to the subscriber access unit RSU3. The two subscriber access units RSU3 and RSUn indicated in the drawing are not, however, connected to the switching network SN. The aforementioned trunk groups, which in the drawing are each represented by a connecting line crossed by a short slash, each comprise at least one trunk line.

By means of the previously described structure of the exchange shown in the drawing, said exchange belonging to a switching system with a large number of such exchanges, communication links can be established from/to the various access lines such as the access lines AL1, AL2, AL3 to ALn under the control of the coordination processor CP via the central switching device, i.e. the central switching network SN. The dialing information necessary for this purpose is usually made available by the individual subscriber stations to the central signaling recording device CCNC over separate signaling channels. The connections concerned here are connections to subscriber stations of other exchanges.

In order to establish communication links between the access lines of one and the same subscriber access unit or between subscriber access units adjacent to one another, i.e. subscriber access units immediately adjacent to one another in the above-mentioned connection arrangement, like the subscriber access units RSU1, RSU2 and RSU3, the procedure followed is in accordance with the method mentioned in the introduction, so that these connections are established only in the respective subscriber access unit or via the trunk groups L12 or L23 running between the subscriber access units adjacent to one another, that is without involving the central switching matrix SN. However, control of these connections is exercised by the central controller of the exchange concerned or at least by its central coordination processor CP.

In order now also to be able to establish communication links between the access lines of subscriber access units which belong to subscriber access units of the exchange under consideration which are not adjacent to one another, such as for example between the subscriber access units RSU1 and RSUn, without involving the central switching unit or the central switching network SN of this exchange, provision is made under the present invention for establishing such communication links between the subscriber access units concerned which are not adjacent to one another via (additional) trunk groups running between these subscriber access units or optionally via at least one further subscriber access unit of the exchange concerned. In the case of subscriber access units RSU2 and RSU3 such trunk groups L2n and L3n run from or to the subscriber access unit RSUn, which is not adjacent to these subscriber access units RSU2 and RSU3. Thus, there are two connection options between the subscriber access unit RSUn and the subscriber access unit RSU1: the one connection runs via the subscriber access unit RSU2, and the other connection runs via the subscriber access units RSU3 and RSU2.

All the subscriber access units of the exchange under consideration can be connected to one another, practically fully intermeshed, via the previously mentioned trunk groups L12, L23, L2n and L3n and via further trunk groups corresponding to these, so that any communication links between these subscriber access units and consequently between the subscriber stations connected to these units can be established without involving the central switching unit, i.e. the central switching matrix SN of the exchange shown. In principle, therefore, the central switching matrix SN can basically be dispensed with here for tie-line traffic between the subscriber access units within the exchange under consideration. However, the connections concerned will continue to be established under the control of the central controller, that is, above all, the coordination process CP and optionally the central signaling recording device CCNC. To this end, the appropriate dialing information can be provided as before by the respective calling subscriber station such as e.g. SUB, via its associated subscriber access unit, such as RSU1, to the central controller, which then carries out the appropriate call control in the subscriber access unit concerned, i.e. RSU1, to which the respective calling subscriber station is connected and in the subscriber access unit to which the respective called subscriber station is connected.

In the course of the procedure described above, such a connection establishment and with it the subsequent transmission of communication or message signals can, as already indicated above, be made not only between subscriber access units adjacent to one another such as, e.g. between subscriber access units RSU1 and RSU2, but also between subscriber access units not adjacent to one another, such as e.g. between subscriber access units RSU1 and RSUn. The connection concerned can be established here either directly via a trunk line existing between the subscriber access units concerned or a trunk group comprising a number of lines or via at least one further subscriber access unit if between the first-mentioned subscriber access units, e.g. between the subscriber access units RSU1 and RSUn, no direct trunk line or no direct trunk group exists or if such a trunk line or such a trunk group is currently busy or faulty. Here the connection route to be used in each case, that is the subscriber access units to be involved in the call concerned are stipulated or defined by the central controller of the exchange concerned.

In derogation of or in addition to the procedure described above, a procedure can also be followed according to the present invention such that, in the course of establishing communication links between access lines which belong to different subscriber access units of the exchange under consideration, the control signals required for establishing such communication links first also be transmitted via the trunk lines between the subscriber access units concerned, such as between the subscriber access units RSUn, RSU2 and RSU1, and then via the usual connection path for such control signals to the central controller.

By this means, where there are n subscriber access units (RSU1 to RSUn), trunk lines or trunk groups between n−1 of these subscriber access units and the central switching network SN can then in principle be dispensed with. In the borderline case, a single trunk line or one trunk group between the subscriber access units concerned and the central switching network SN of the exchange concerned whose remaining subscriber access units are connected via trunk lines or trunk groups either directly or indirectly to the one subscriber access unit concerned, will therefore be sufficient in order to process the control procedures required for connection establishment.

If—which broadly applies in the present case—a subscriber access unit is connected to a number of subscriber access units of one and the same exchange via a corresponding number of separate trunk lines or trunk groups, then the trunk lines or trunk groups to be used by the one subscriber access unit concerned for transmitting communication signals to other subscriber access units of the same exchange are determined in the central controller, and in particular by the central coordination processor CP. Determination of the separate trunk lines or trunk groups to be used in each case in the course of transmitting communication signals can also be made in the event of overflow traffic. In each case, the control functions are performed by the aforementioned central controller of the exchange concerned.

The method according to the invention can then also be applied in cases where the line terminator groups of the subscriber access units, such as line terminator group LTG2 of the subscriber access unit RSU1, are additionally connected to trunk groups which lead to other exchanges in the switching system. Such trunk groups are indicated in the drawing in respect of subscriber access units RSU1, RSU2, RSU3 and RSUn by LT1, LT2, LT3 and LTn. Here, each trunk group comprises a whole series of transmission lines, which is indicated in each case by means of a line crossed by a short slash.

If such trunk groups are present, communication links from or to other such exchanges do not need to be routed via the switching network SN forming the central switching unit of the exchange shown but can be established directly from the individual subscriber access units, i.e. without involving the central switching unit of the exchange concerned. The aforementioned trunk groups can incidentally also be recorded for load or traffic measurements, which can preferably be carried out by the central coordination processor of the exchange concerned.

In conclusion, it should be noted that, in the event of the trunk group running between the subscriber access units being busy or faulty, it is possible to establish a connection optionally via the central switching matrix of the exchange concerned. However, in order to do this, an appropriate connection is required between the subscriber access units concerned and the switching matrix SN.

Finally, the invention being thus described, it will be obvious that the same may be varied in many ways. The variations are not to be regarded as a departure from the spirit and scope of the invention, and all such modifications as would be obvious to one skilled in the art are intended to be included within the scope of the following claims.

We claim:

1. A method for establishing communication links to and from access lines in an exchange of a switching system, the exchange comprising a number of subscriber access units, a central switching unit, and a central controller, wherein each subscriber access unit has line termination units coupled to the access lines to connect to subscriber terminal equipment, and wherein the number of subscriber access units includes subscriber access units that are adjacent to one another and subscriber access units that are not adjacent to one another, the method comprising:

coupling the subscriber access units to one another;

coupling each subscriber access unit to the central controller, wherein the central controller is configured to establish communication links via the central switching unit;

establishing a first connection between access lines of line termination units without an involvement of the central switching unit directly in the subscriber access unit concerned when the line termination unite belong to one and the same subscriber access unit, and between the subscriber access units, which are coupled to one another and are adjacent to one another, when the line termination units belong to adjacent subscriber access units; and establishing a second connection between access lines of line termination units, which belong to subscriber access units that are not adjacent to one another, via one of trunk lines running directly between these subscriber access units and truck lines running between at least one other subscriber access unit, under control of the central controller, but without involvement of the central switching unit of the exchange.

2. The method of claim 1, further comprising the steps of: transmitting both communication signals and control signals via said trunk lines between subscriber access units of said exchange.

3. The method of claim 1, further comprising determining in said central controller trunk lines to be used by a subscriber access unit for transmitting control signals to other subscriber access units of a same exchange, if said subscriber access unit is connected to a number of other subscriber access units via a number of trunk lines corresponding to a number of said other subscriber access units.

4. The method of claim 3, wherein said step of determining is performed in an event of overflow traffic.

5. The method of claim 1, wherein said subscriber access units are also used for connecting transmission lines to or from other exchanges.

* * * * *